United States Patent
Cho et al.

(10) Patent No.: US 8,593,492 B2
(45) Date of Patent: Nov. 26, 2013

(54) LIGHT GUIDE PLATE, BACKLIGHT UNIT AND DISPLAY APPARATUS INCLUDING THE SAME AND MANUFACTURING METHOD THEREOF

(75) Inventors: Yun-jung Cho, Suwon-si (KR); Koichi Hanasaki, Kanagawaken (JP); Dae-hee Lee, Hwaseong-si (KR); Hyeong-sik Choi, Hwaseong-si (KR); Myung-ryul Jung, Hwaseong-si (KR); Do-hyeon Baek, Yongin-si (KR); Sin-wook Hyung, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 13/290,652

(22) Filed: Nov. 7, 2011

(65) Prior Publication Data

US 2012/0162281 A1   Jun. 28, 2012

(30) Foreign Application Priority Data

Dec. 27, 2010   (KR) .................. 10-2010-0135562

(51) Int. Cl.
   *G09G 5/10*   (2006.01)
(52) U.S. Cl.
   USPC .......................................................... 345/690
(58) Field of Classification Search
   USPC ........................................ 345/690, 204, 207
   See application file for complete search history.

(56) References Cited

U.S. PATENT DOCUMENTS

| | | | | |
|---|---|---|---|---|
| 4,342,908 A | * | 8/1982 | Henningsen et al. | 250/227.11 |
| 5,187,606 A | * | 2/1993 | Kondo et al. | 359/196.1 |
| 6,707,605 B2 | * | 3/2004 | Sekiguchi | 359/443 |
| 6,729,746 B2 | * | 5/2004 | Suehiro et al. | 362/241 |
| 6,953,265 B2 | * | 10/2005 | Suehiro et al. | 362/241 |
| 7,478,938 B2 | * | 1/2009 | Watanabe et al. | 362/607 |
| 7,619,960 B2 | * | 11/2009 | Ohta | 369/112.28 |
| 2009/0122229 A1 | | 5/2009 | Kim et al. | |

FOREIGN PATENT DOCUMENTS

| | | |
|---|---|---|
| KR | 10-2007-0100534 A | 10/2007 |
| KR | 10-2008-0028684 A | 4/2008 |
| KR | 10-2009-0048898 A | 5/2009 |
| KR | 10-2010-0040101 A | 4/2010 |

* cited by examiner

*Primary Examiner* — Fred Tzeng
(74) *Attorney, Agent, or Firm* — Sughrue Mion, PLLC (57) ABSTRACT

A light guide plate, a backlight unit and a display apparatus including the same and a manufacturing method thereof are provided. The light guide plate includes: a body which includes an incident surface and an emission surface; at least one first optical path converter which is formed in an opposite surface of the body which is opposite to the emission surface, and extends continuously in a first direction to convert an optical path of an incident light introduced through the incident surface so that the incident light passes through the emission surface; and at least one second optical path converter which is formed in the opposite surface, and is arranged discontinuously in at least one row extending in the first direction.

19 Claims, 10 Drawing Sheets

LIGHT GUIDE PLATE, BACKLIGHT UNIT AND DISPLAY APPARATUS INCLUDING THE SAME AND MANUFACTURING METHOD THEREOF

CROSS-REFERENCE TO RELATED APPLICATION

This application claims priority from Korean Patent Application No. 10-2010-0135562, filed on Dec. 27, 2010 in the Korean Intellectual Property Office, the disclosure of which is incorporated herein by reference.

BACKGROUND

1. Field

Apparatuses and methods consistent with exemplary embodiments relate to a light guide plate, a backlight unit and a display apparatus including the same and a manufacturing method thereof, and more particularly, to a light guide plate which realizes a clearer picture quality, a backlight unit and a display apparatus including the same and a manufacturing method thereof.

2. Description of the Related Art

In recent years, three-dimensional (3D) technology has been added to a display apparatus such as a television (TV), leading to the introduction of a 3D TV that provides 3D images with a two-dimensional (2D) screen. A method of realizing a 3D image is as follows: (i) a left eye image and a right eye image are divided on a time basis and displayed on a screen of a display apparatus, (ii) a left filter and a right filter of shutter glasses are alternately open and closed according to the displayed left eye image and right eye image, and (iii) different images are provided to both eyes, respectively.

However, the left eye image and the right eye image should be realized as independent screens to provide a clearer picture quality with a 3D effect.

SUMMARY

One or more exemplary embodiments provide a light guide plate, a backlight unit and a display apparatus including the same and a manufacturing method thereof which provides a clearer picture quality.

One or more exemplary embodiments also provide a light guide plate, a backlight unit and a display apparatus including the same and a manufacturing method thereof which has relatively high brightness.

According to an aspect of an exemplary embodiment, there is provided a light guide plate including: a body which includes an incident surface and an emission surface; at least one first optical path converter which is formed in an opposite surface the body which is opposite to of the emission surface, and extends continuously in a first direction to convert an optical path of an incident light introduced through the incident surface so that the incident light passes through the emission surface; and at least one second optical path converter which is formed in the opposite surface, and is arranged discontinuously in at least one row extending in the first direction.

The first direction may include a lengthwise direction of the body of the light guide plate, a widthwise direction of the body and an inclined direction which is inclined at an angle with the lengthwise direction.

The at least one first optical path converter may include a plurality of first optical path converters extending continuously in the first direction and arranged in parallel a second direction which is perpendicular to the first direction, and the at least one second optical path converter may be interposed between the plurality of first optical path converters.

The at least one second optical path converter may include a plurality of second optical path converters interposed between the plurality of first optical path converters, a first one of the plurality of second optical path converters may be arranged discontinuously in a first row which extends in the first direction, and a second one of the plurality of second optical path converters may be arranged discontinuously in a second row which extends in the first direction and is spaced from the first row in a second direction perpendicular to the first direction.

The second optical path converters in the first and second rows may be arranged in a zigzag pattern in the particular direction.

The first and second optical path converters may include at least one of a notch and an ink dot.

The light guide plate may further include a plurality of projections which protrude from the emission surface.

The foregoing and/or other aspects may be achieved by providing a backlight unit including: a light guide plate according to the above configuration; and a light source which outputs light to the incident surface of the light guide plate.

According to an aspect of another exemplary embodiment, there is provided a display apparatus including: a liquid crystal display (LCD) panel; an image processor which processes an image to be displayed on the LCD panel; and a backlight unit according to the above configuration which supplies light to the LCD panel.

The foregoing and/or other aspects may be achieved by providing a manufacturing method of a light guide plate, the method including: forming a body which includes an incident surface and an emission surface; forming at least one first optical path converter on in an opposite surface of the body which is opposite to the emission surface, the at least one first optical path converter extending continuously consecutively in a particular first direction to convert an optical path of an incident light introduced through the incident surface so that the incident light passes through the emission surface; and forming at least one second optical path converter in the opposite surface, the at least one second optical path converter arranged discontinuously in at least one row extending in the first direction.

The forming the at least one first optical path converter may include forming a notch extending continuously in the first direction on the opposite surface by laser.

The forming the at least one second optical path converter may include forming by a laser a plurality of notches arranged discontinuously in the at least one row.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Hereinafter, a light guide plate, a backlight unit and a display apparatus including the same and a manufacturing method thereof according to exemplary embodiments will be described with reference to the accompanying drawings.

Figure 1:
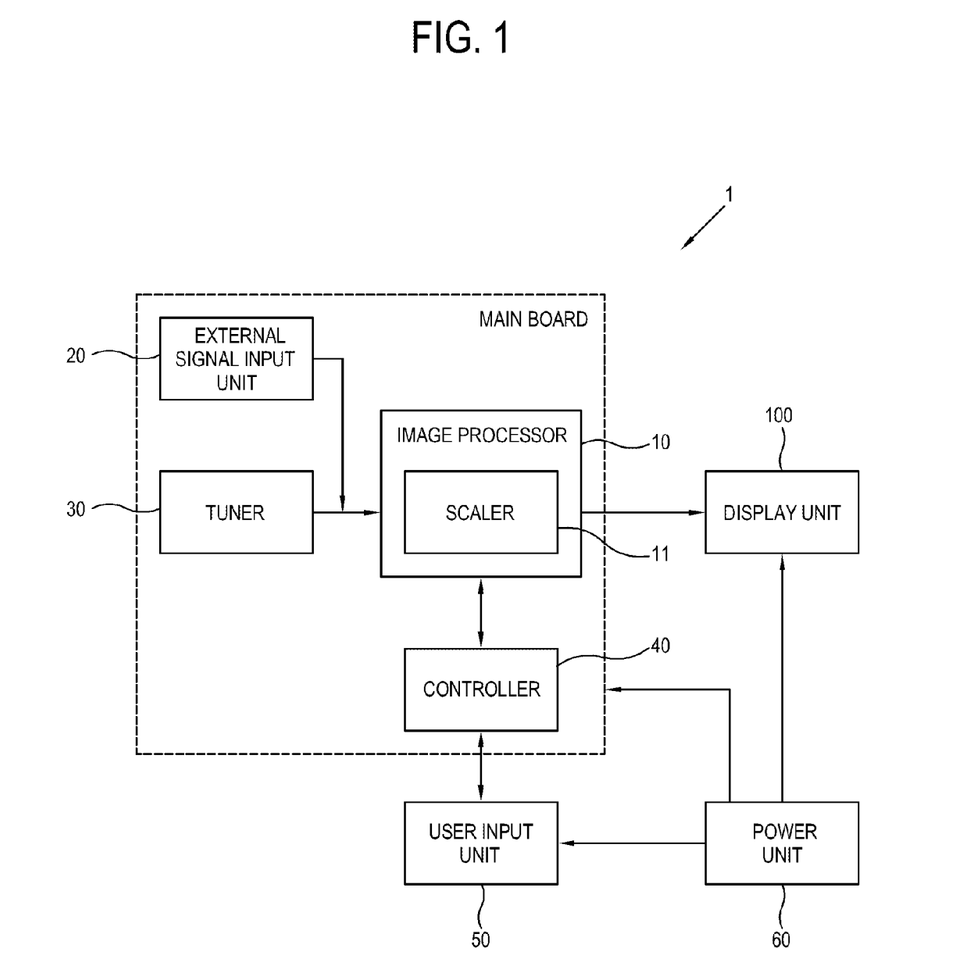
FIG. 1 is a block diagram of a display apparatus according to a first exemplary embodiment.

As shown in FIG. 1, a display apparatus 1 according to an exemplary embodiment includes a display unit 100; a tuner 30 which receives a broadcasting signal from a broadcasting station; an external signal input unit 20 which receives an external image signal such as a digital versatile disk (DVD); an image processor 10 which processes a broadcasting signal received from the tuner 30 or an image signal received from an external image source by the external signal input unit 20 to be displayed on the display unit 100; a controller 40 which controls the image processor 10; and a power source unit 60 which supplies power to the display unit 100, the image processor 10, the tuner 30 and the controller 40. One of the external signal input unit 20 and the tuner 30 may be omitted from the display apparatus 1.

The image processor 10 may include a scaler 11 to output an image signal that is scaled to correspond to a resolution of the display unit 100. That is, the image processor 10 performs an analog-to-digital (A/D) conversion function, a digital decoding function, and a predetermined format conversion function to convert various input image signals into a digital image signal in a predetermined format by a control of the controller 40. The scaler 11 may scale a vertical frequency, a resolution and a picture ratio of an input digital image signal and/or analog image signal to meet output standards of the display unit 100.

The power source unit 60 may supply power to an LCD panel 110 of the display unit 100 and the backlight unit 200.

The tuner 30, the external signal input unit 20, the image processor 10 and the controller 40 may be installed in a single main board, but the exemplary embodiment is not limited thereto. Alternatively, at least one of the foregoing elements may be provided in an additional board.

The display apparatus 1 according to the present exemplary embodiment may further include a user input unit 50. The user input unit 50 may include at least one of a remote controller and a front panel.

Figure 2:
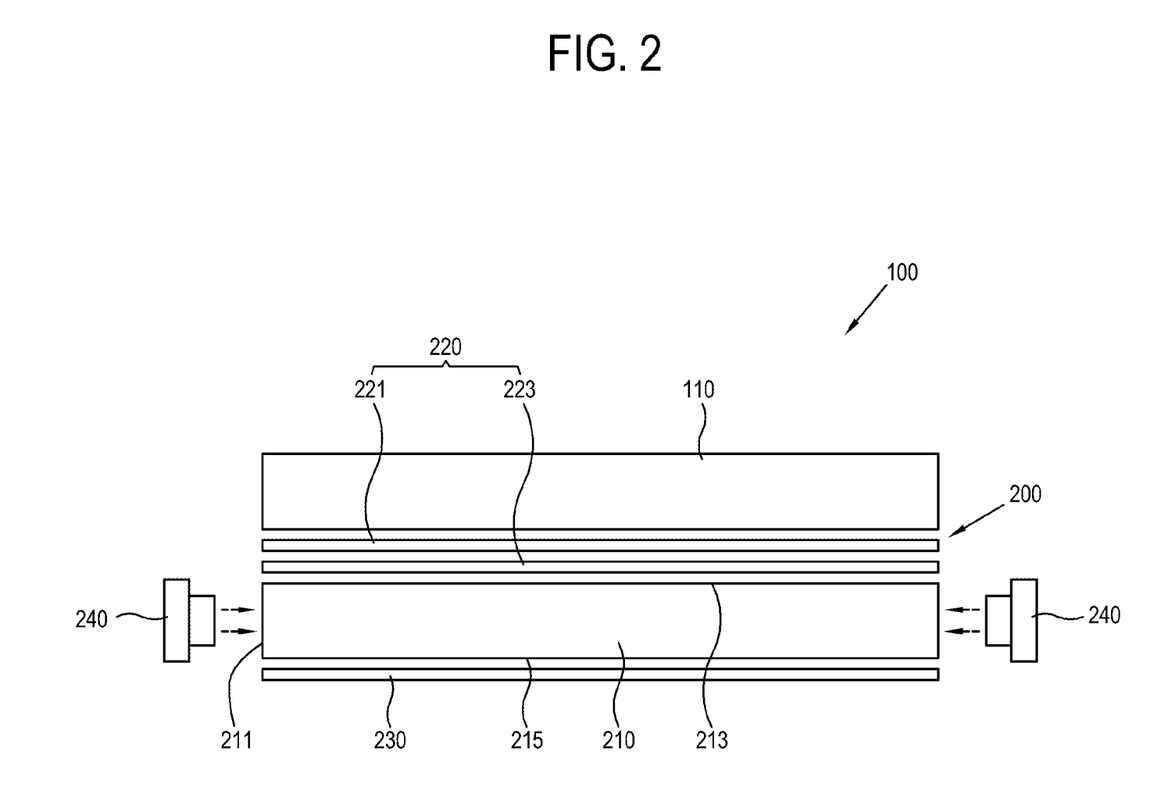
FIG. 2 is a sectional view of major parts of a display unit in FIG. 1.

As shown in FIG. 2, the display unit 100 includes the LCD panel 110, and the backlight unit 200 to emit light to the LCD panel 110.

The LCD panel 110 includes a thin film transistor (TFT) substrate (not shown); a color filter substrate (not shown) attached to and facing the TFT substrate; and a liquid crystal layer provided between the TFT substrate and the color filter substrate.

The backlight unit 200 includes a light source 240 which outputs light to the LCD panel 110; a light guide plate 210 which guides light from the light source 240 to the LCD panel 110; a reflection member 230 which is provided at a surface 215 of the light guide plate 210 (opposite surface) opposite to a surface 213 of the light guide plate 210 (emission surface) facing the LCD panel 110 and reflects light passing through the light guide plate 210 to the LCD panel 110; and an optical sheet 220 which focuses and diffuses light emitted through the emission surface 213 of the light guide plate 210. The optical sheet 220 and the reflection member 230 may be omitted as the case may be.

The optical sheet 220 includes a diffusion sheet 223 which diffuses light emitted through the emission surface 213 of the light guide plate 210; and a prism sheet 221 which focuses the emitted light. The arrangement location of the diffusion sheet 223 and the prism sheet 221 may be opposite to those in FIG. 2 as necessary. That is, the prism sheet 221 may be adjacently arranged to the light guide plate 210.

The light source 240 may include a plurality of light emitting diodes (LEDs) arranged in a lengthwise direction.

Figure 3:
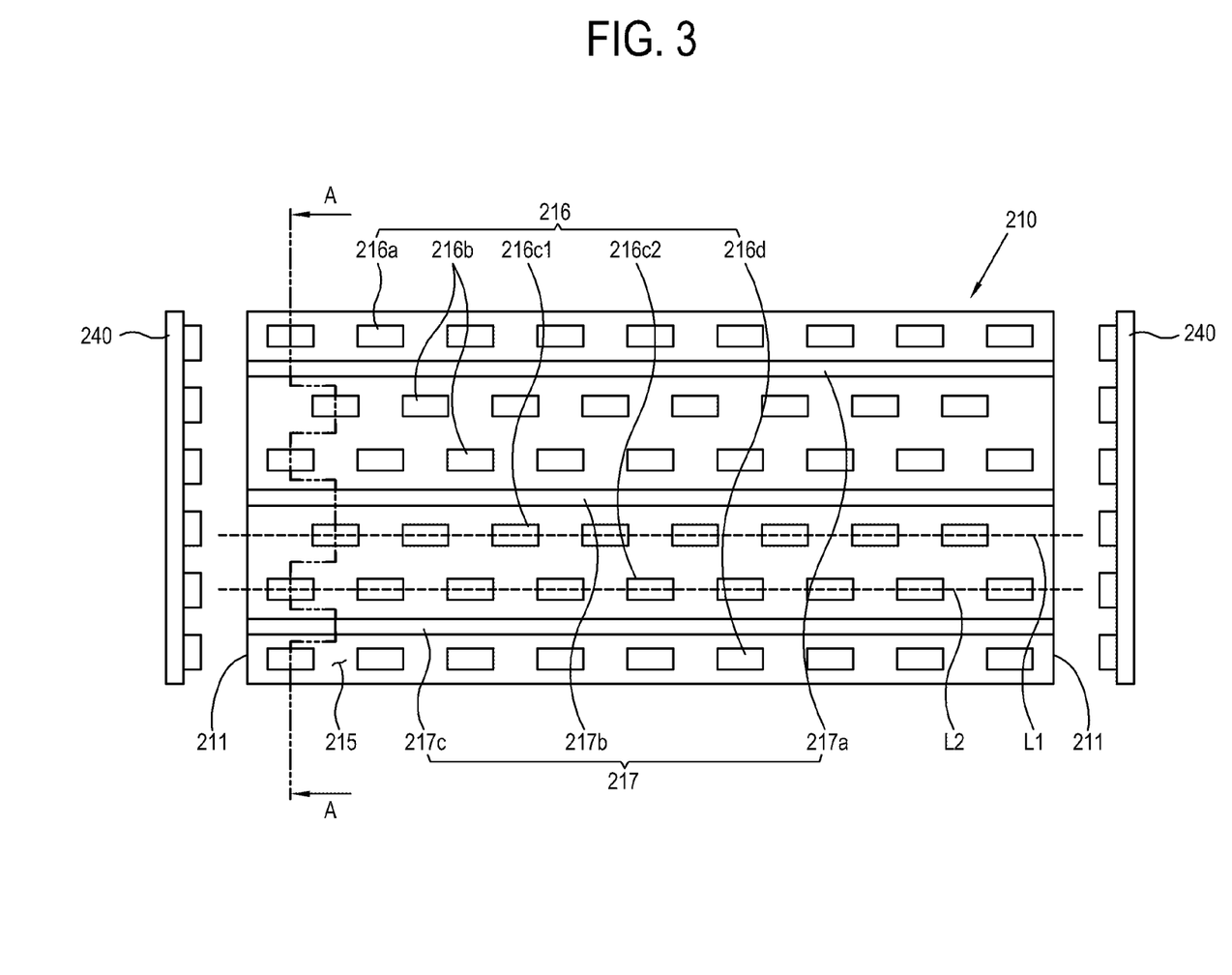
FIG. 3 is a rear perspective view of the display unit in FIG. 2.

As shown in FIGS. 2 and 3, the light source 240 may be provided along a circumference of the light guide plate 210. More specifically, the light source 240 may be provided on the left and right sides of the light guide plate 210 in a width direction thereof. Alternatively, the light source 240 may be provided upper and lower sides of the light guide plate 210 in a lengthwise direction thereof, or the light guide plate 240 may be provided on the left and right sides and the upper and lower sides of the light guide plate 210. That is, the light source 240 may be provided at four circumferential surfaces of the light guide plate 210. Also, the light source 240 may otherwise be provided in one of the left and right sides in the width direction and one of the upper and lower sides in the lengthwise direction.

The light guide plate 210 according to the first exemplary embodiment includes an incident surface 211 which receives light from the light source 240; and the emission surface 213 from which the incident light is emitted to the LCD panel 110.

The light guide plate 210 may include a material which has a reflective index such that light introduced through the incident surface 211 causes a total reflection inside the light guide plate 210. For example, the light guide plate 210 may include acryl or glass.

The light guide plate 210 includes a first optical path converter 217 which is provided in the opposite surface 215 of the emission surface 213.

The first optical path converter 217 converts an optical path of an incident light introduced through the incident surface 211 to be emitted through the emission surface 213. That is, the first optical path converter 217 converts the optical path to allow the light within the light guide plate 210 to pass through the emission surface 213 without total reflection from the emission surface 213.

The first optical path converter 217 is continuously arranged in a particular direction. For example, as shown in FIG. 3, the first optical path converter 217 may be continuously disposed in a lengthwise direction of the light guide plate 210. The first optical path converter 217 is continuously disposed in the lengthwise direction of the light guide plate 210 to thereby block a diffusion of the light in the width direction of the light guide plate 210. Then, if only the light source 240 in a particular area is turned on in the width direction of the light guide plate 210, such effect may be prevented from being distributed to other adjacent areas. That is, only the brightness of a particular area of the light guide plate 210 may selectively increase.

The first optical path converter 217 extends linearly, but exemplary embodiment are not limited thereto. Alternatively, the first optical path converter 217 may extend in a curved line.

The first optical path converter 217 may include a plurality of optical path converters arranged at a predetermined interval in a traverse direction of the lengthwise direction. For example, as shown in FIG. 3, a plurality of first optical path converters 217, 217a, 217b and 217c may arranged at a predetermined interval in the width direction of the light guide plate 210. Alternatively, a single first optical path converter 217 may be provided.

The light guide plate 210 further includes a second optical path converter 216 which is formed in the surface 215 opposite to the emission surface 213.

The second optical path converters 216 is formed in opposite sides, with the first optical path converter 217 interposed therebetween.

The second optical path converter includes a plurality of second optical path converters 216, 216a, 2166, 216c1, 216c2 and 216d which are arranged in a same direction in which the first optical path converter 217 is formed, and more specifically, are arranged separately or discontinuously in a direction substantially parallel to the direction in which the first optical path converter 217 is disposed.

The second optical path converters 216a and 216b may be alternately arranged, with the first optical path converter 217a interposed therebetween. That is, the second optical path converters 216a and 216b may be arranged in a zigzag or staggered pattern, with the first optical path converter 217a therebetween.

The second optical path converters 216c2 and 216d may be arranged symmetrically to the first optical path converter 217c. For example, although not shown in the drawings, the second optical path converters 216c2 and 216d may be formed in a zigzag or staggered pattern, with the first optical path converter 217a interposed therebetween.

The second optical path converters 216c1 and 216d in two rows may be arranged between the plurality of first optical path converters 217b and 217c adjacent to each other, but exemplary embodiments are not limited thereto. Alternatively, the second optical path converters 216 may be arranged in a single row, or three or more rows between the plurality of first optical path converters 217b and 217c adjacent to each other.

The second optical path converter 216c1 in the first row may be arranged along a first virtual line L1 in parallel with a lengthwise direction of the light guide plate 210, and the second optical path converter 216c2 in the second row may be arranged along a second virtual line L2 in substantially parallel with the first virtual line L1. The second optical path converters 216c1 and 216c2 may be arranged in a zigzag or staggered pattern in the lengthwise direction of the light guide plate 210.

Figure 4:
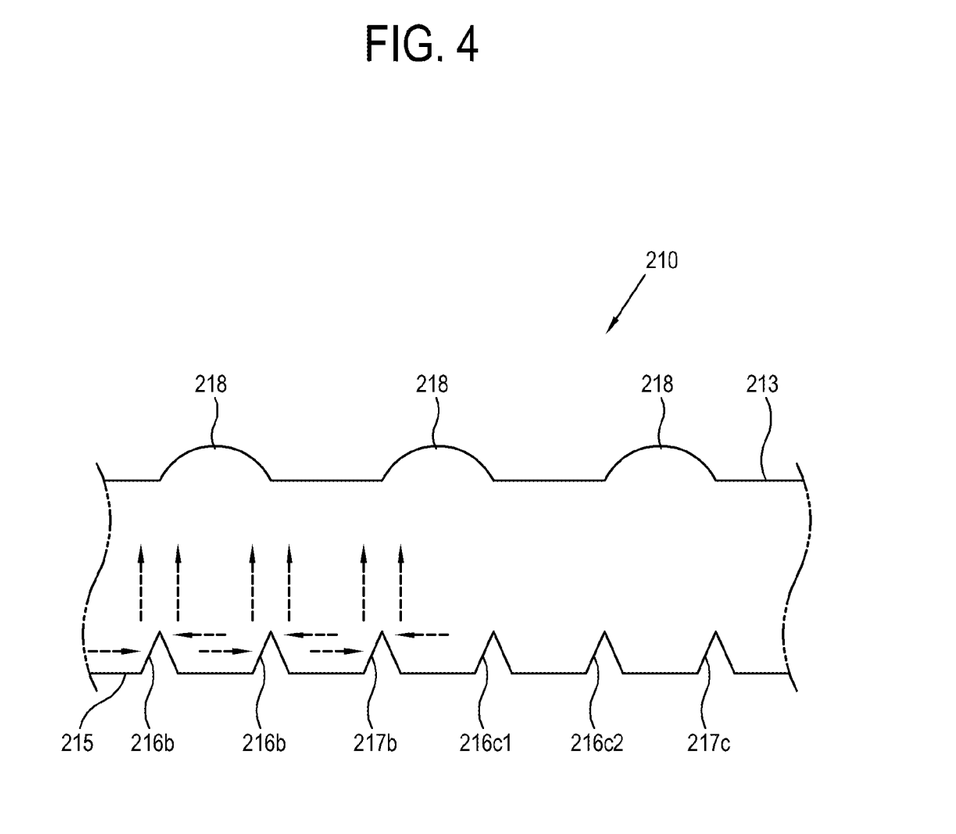
FIG. 4 is a sectional view of the display unit, taken along line A-A in FIG. 3.

As shown in FIG. 4, the first and second optical path converters 216 and 217 may be shaped like a notch. The first and second optical path converters 216 and 217 may be formed by laser or V-cutter.

The first and second optical path converters 216 and 217 may be not shaped like a notch but formed by ink dot by a print method. The first and second optical path converters 216 and 217 may have various shapes and may be formed by various processing methods as long as they convert the optical path of the light within the light guide plate 210 and allow the light to pass through the emission surface 213 without total reflection from the emission surface 213.

The first and second optical path converters 217 and 216 may be several to dozens of μm in width. A pattern of the first and second optical path converters 217 and 216 may be formed in the opposite surface 215 of the light guide plate 210.

The light guide plate 210 may further include a plurality of projections 218 which protrude locally from the emission surface 213.

The plurality of projections 218 may have a prism or lenticular shape. The plurality of projections 218 focus light emitted from the emission surface 213. Accordingly, the output of the incident light is presumably the same, such that brightness of the LCD panel 110 may further increase.

Figure 5A:
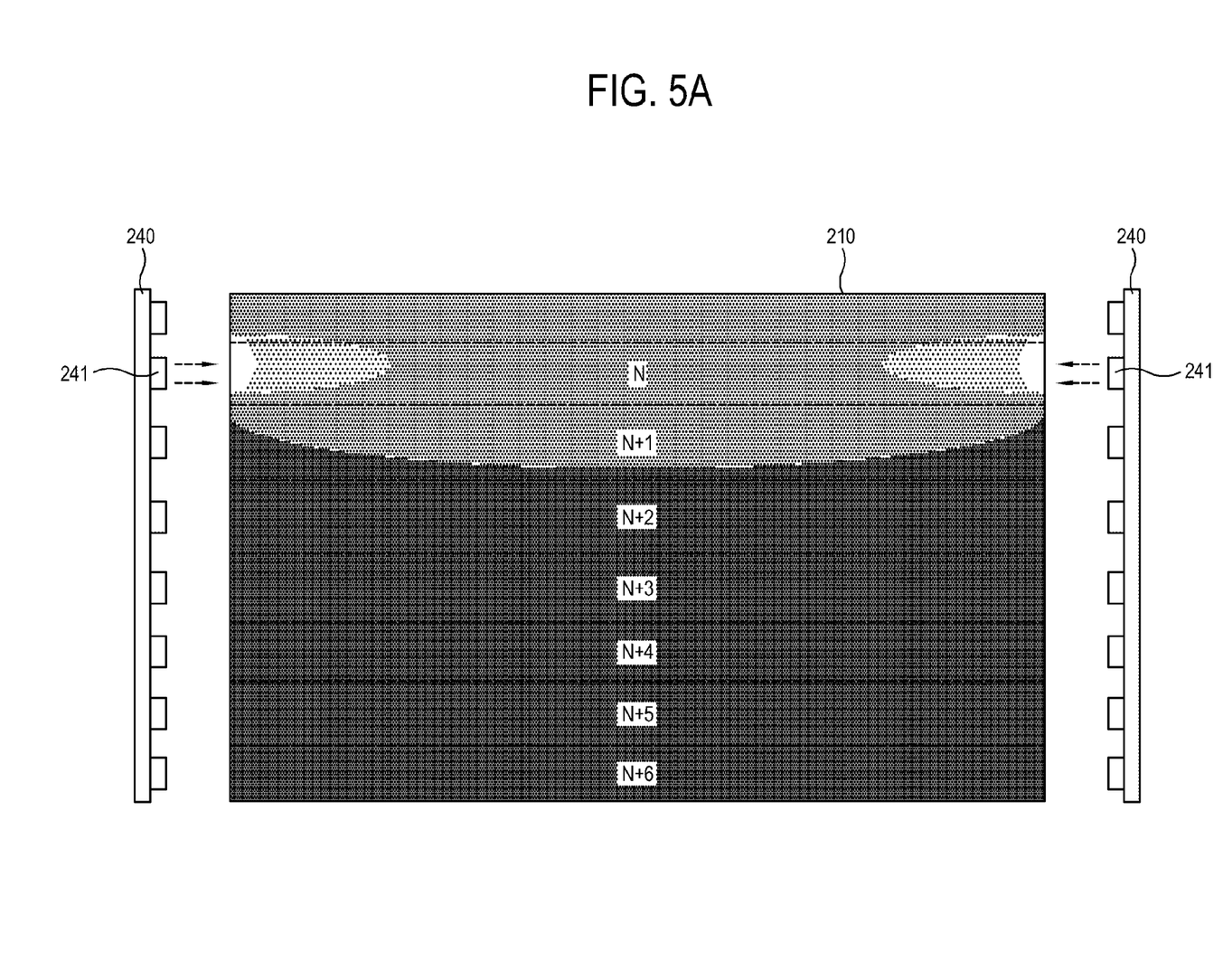
FIGS. 5A and 5B are a plan view for explaining a test condition of a light guide plate in FIG. 2 and a graph for illustrating a rest result of the light guide plate.

The per-area brightness control effect of the light guide plate 210 where the first optical path converter 217 is formed continuously and the second optical path converter 216 is formed discontinuously will be described with reference to FIGS. 5A and 5B.

As shown therein, the light guide plate 210 is divided into an N area, an N+1 area, an N+2 area, an N+3 area, an N+4 area, an N+5 area and an N+6 area spaced from each other at a predetermined interval in the width direction of the light guide plate 210. If only the light source 241 corresponding to the N area is turned on out of the light sources 240, the brightness in the remaining areas may be measured as in FIG. 5B and Table 1.

In Table 1, example light guide plate A refers to the light guide plate 210 in which the first and second optical path converters 217 and 216 all exist, and example light guide plate B refers to a light guide plate in which second optical path converters 216 are discontinuously arranged as a whole. Light guide plates A and B have the same conditions including size and material, except the foregoing differences.

TABLE 1

Figure 5B:
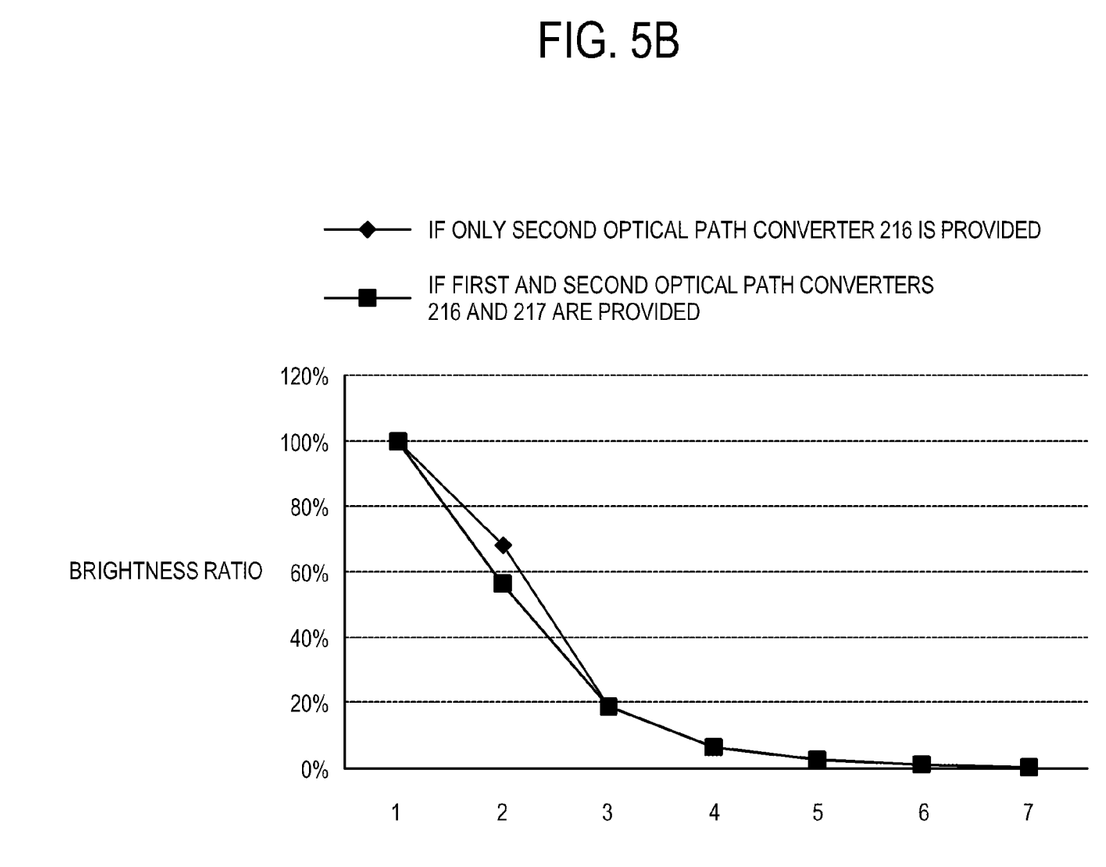

| Areas of Light Guide Plate | A (Brightness) | B (Brightness) | FIG. 5B |
|---|---|---|---|
| N | 100% | 100% | 1 |
| N + 1 | 56% | 68% | 2 |
| N + 2 | 18% | 18% | 3 |
| N + 3 | 5% | 6% | 4 |
| N + 4 | 2% | 2% | 5 |
| N + 5 | 1% | 1% | 6 |
| N + 6 | 0% | 0% | 7 |

In FIG. 5B and Table 1, if brightness of the N area is presumably 100, the brightness of the remaining areas is indicated as a relative value (%) compared to the brightness of the N area.

As shown in FIG. 5B and Table 1, in the case of the light guide plate A, the brightness of the N+1 area is 56%. In the case of the light guide plate B, the brightness of the N+1 area is 68%. That is, if the light source in the particular area of the light guide plate A is turned on or off, the brightness is decreasingly distributed to the adjacent area. Accordingly, the brightness of the particular area of the light guide plate is controlled by turning on or off the light source, to thereby realize a clearer picture quality.

Table 2 illustrates results of brightness in each area when left and right light sources in the light guide plates A and B are all turned on.

TABLE 2

| A | | | | | | | B | | | | | | |
|---|---|---|---|---|---|---|---|---|---|---|---|---|---|
| 4270 | 3940 | 3600 | 4050 | 3730 | 4300 | 4760 | 4200 | 3720 | 3550 | 4190 | 3560 | 3790 | 4200 |
| 4690 | 4220 | 3840 | 4280 | 4030 | 4600 | 5240 | 4510 | 3990 | 3850 | 4400 | 3840 | 4280 | 4660 |
| 4950 | 4420 | 4000 | 4410 | 4140 | 4680 | 5320 | 4620 | 4190 | 4070 | 4620 | 4010 | 4330 | 4820 |
| 5090 | 4550 | 4100 | 4560 | 3970 | 4560 | 5240 | 4750 | 4280 | 4170 | 4530 | 4050 | 4330 | 4900 |
| 4940 | 4370 | 4080 | 4610 | 4000 | 4450 | 4920 | 4630 | 4200 | 4130 | 4630 | 4060 | 4260 | 4690 |
| 4740 | 4300 | 4050 | 4560 | 4060 | 4400 | 4850 | 4530 | 4130 | 4060 | 4630 | 4000 | 4210 | 4560 |
| 4490 | 4170 | 3870 | 4360 | 3900 | 4130 | 4600 | 4360 | 4040 | 3900 | 4460 | 3860 | 3970 | 4360 |

| Central Brightness | Average Brightness | Degree of Uniformity (%) | Central Brightness | Average Brightness | Degree of Uniformity (%) |
|---|---|---|---|---|---|
| 4560 | 4396 | 92 | 4530 | 4247 | 86 |
| 101% | 104% |  | 100% | 100% |  |

As shown in Table 2, an average brightness of the light guide plate A increases by 4% compared to the light guide plate B, and the degree of uniformity improves by 7% ((92−86)/86).

That is, in the light guide plate 210 according to the first exemplary embodiment, a part of the light source 240 is selectively turned on or off to control the brightness of the particular area of the light guide plate 210. More specifically, if the light source corresponding to the particular area of the light guide plate 210 is turned on, the effect of the light source to the brightness of the adjacent area may be reduced. Accordingly, a clearer picture quality may be realized.

In a case of a 3D image which displays a left eye image and a right eye image on a time basis, realization of a clearer picture quality may clarify a difference of picture quality between the left eye image and right eye image. Then, 3D cross talk may be reduced.

Figure 6:
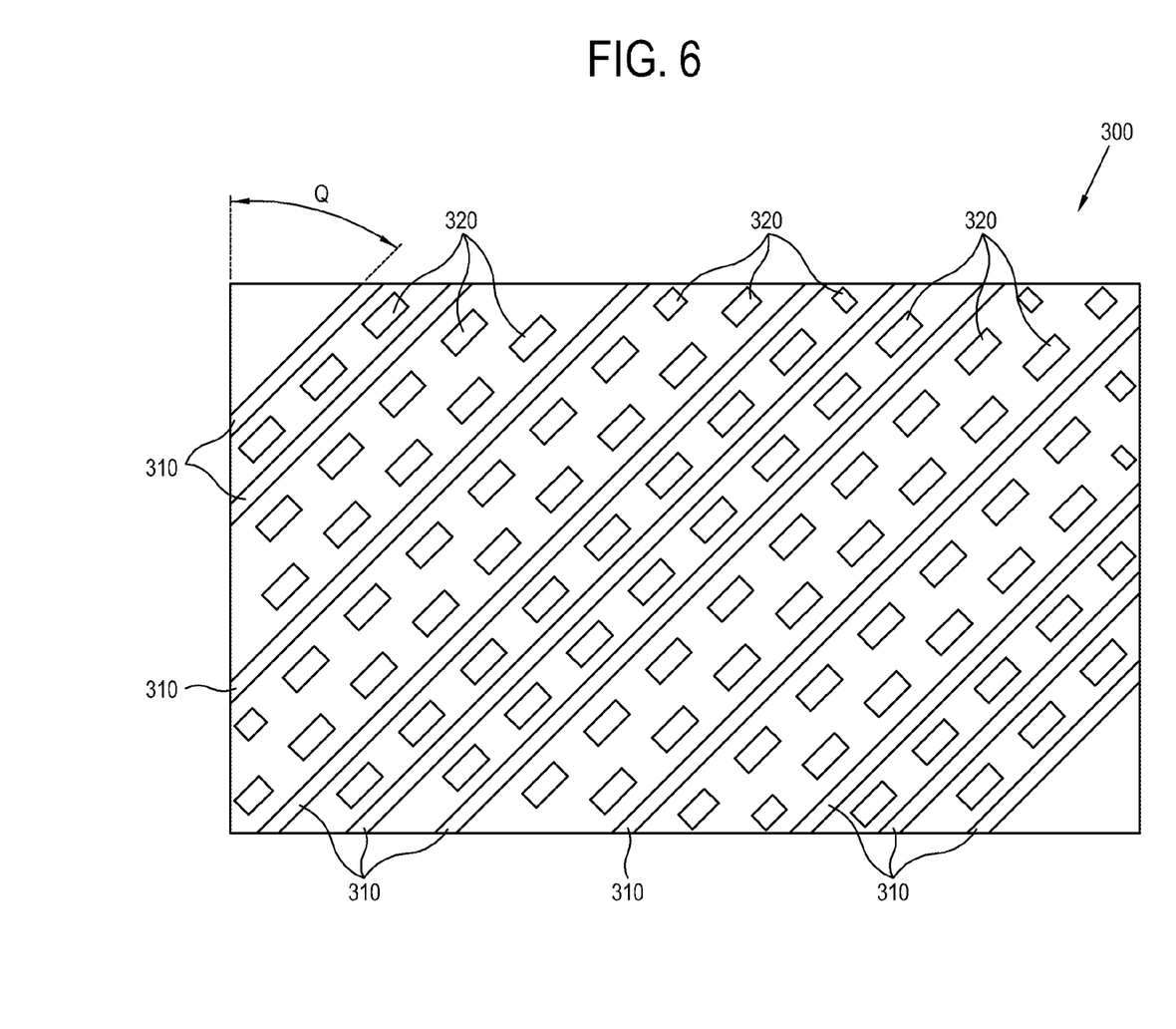
FIG. 6 is a rear perspective view of a light guide plate according to a second exemplary embodiment.

As shown in FIG. 6, a light guide plate 300 according to a second exemplary embodiment includes a first optical path converter 310 and a second optical path converter 320 which are formed in the opposite surface.

While the first optical path converter 217 according to the first exemplary embodiment is formed in the lengthwise direction of the light guide plate 210, the first optical path converter 310 according to the second exemplary embodiment is inclined at a particular angle instead of being in parallel with the lengthwise direction. The first optical path converter 310 may be inclined at a predetermined angle θ with respect to the width direction of the light guide plate 300.

The second optical path converters 320 may be arranged in opposite sides, leaving the first optical path converter 310 therebetween. The second optical path converters 320 may be provided between the plurality of first optical path converters 310 in a single row or two rows in the arrangement direction of the first optical path converter 310.

Figure 7:
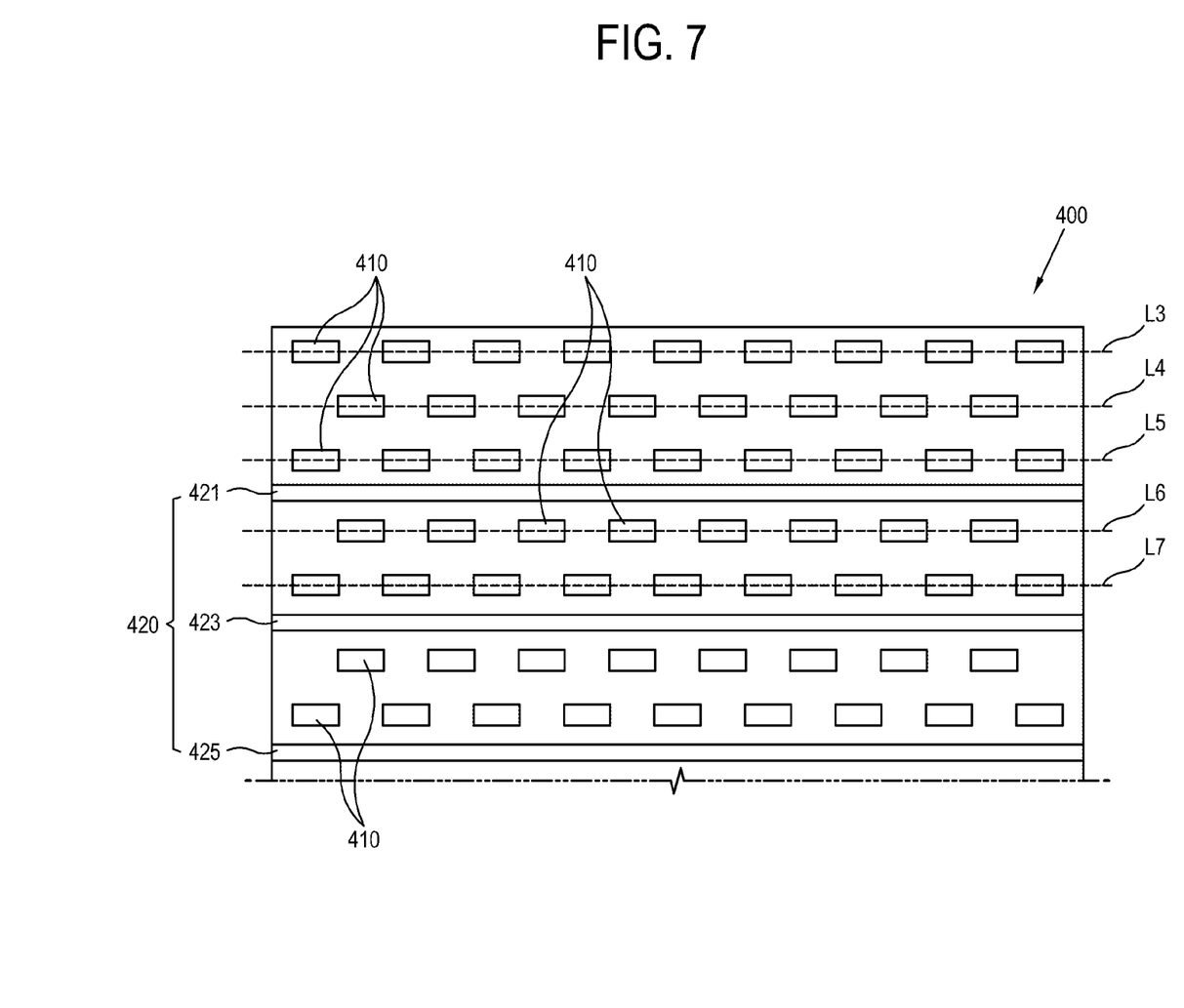
FIG. 7 is a rear perspective view of a light guide plate according to a third exemplary embodiment.

As shown in FIG. 7, a light guide plate 400 according to a third exemplary embodiment may include a first optical path converter 420 and a second optical path converter 410 formed in the opposite surface of the emission surface.

The first optical path converters 420, 421, 423 and 425 may be arranged in the lengthwise direction of the light guide plate 400.

The second optical path converters 410 may be formed in three rows L3, L4 and L5 between an upper circumference of the light guide plate 400 and the first optical path converter 421.

The second optical path converters 410 may be formed in two rows L6 and L7 between the plurality of first optical path converters 421 and 423. The second optical path converter 410 may be formed in predetermined rows instead of two rows between the plurality of first optical path converters 421 and 423.

The plurality of second optical path converters 410 which is adjacent to each other may be provided in a zigzag pattern in the lengthwise direction.

Figure 8:
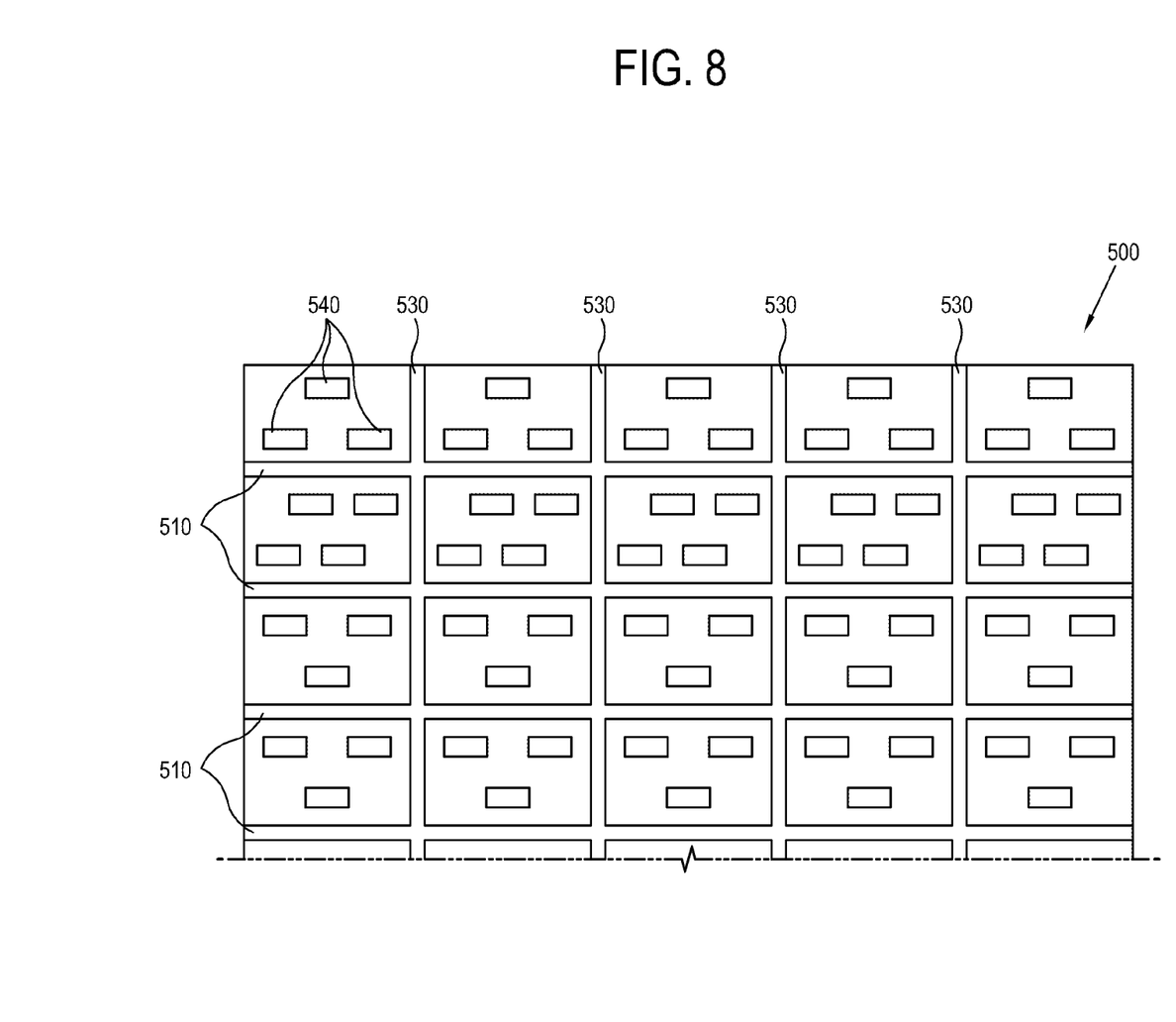
FIG. 8 is a rear perspective view of a light guide plate according to a fourth exemplary embodiment.

As shown in FIG. 8, a light guide plate 500 according to a fourth exemplary embodiment may include first optical path converters 510 and 530 and a second optical path converter 540 formed in the opposite surface of the emission surface.

The first optical path converters 510 and 530 may continuously extend in different directions. More specifically, the first optical path converter 510 is continuously arranged in the lengthwise direction of the light guide plate 500, and the first optical path converter 530 is continuously arranged in the width direction of the light guide plate 500. Accordingly, a grid pattern is formed by the first optical path converters 510 and 530.

The first optical path converters 510 and 530 are perpendicular to each other, but exemplary embodiments are not limited thereto. For example, the first optical path converters 510 and 530 may cross each other without being perpendicular to each other.

As shown in FIG. 8, the second optical path converter 540 may include a plurality of second optical path converters arranged in the grid pattern formed by the first optical path converters 510 and 530 which are continuously formed in different directions.

Figure 9:
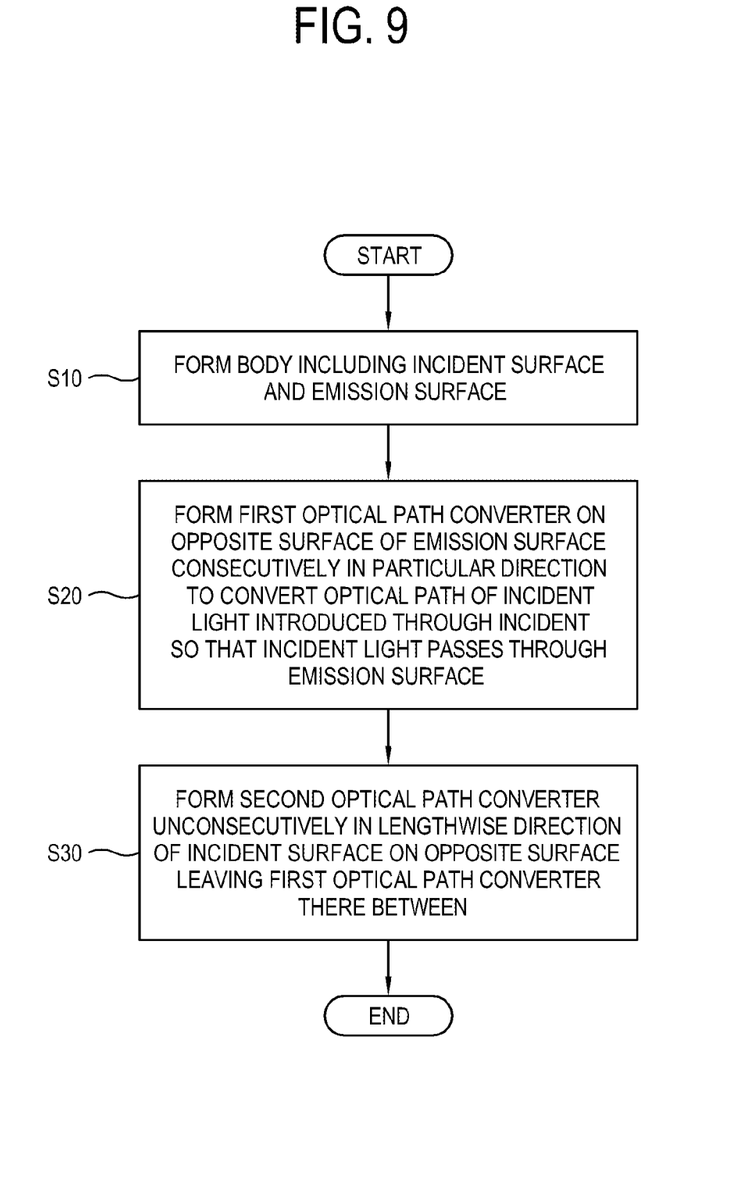
FIG. 9 is a flowchart of a manufacturing method of the light guide plate according to the exemplary embodiments.

Hereinafter, a manufacturing method of the light guide plate according to an exemplary embodiment will be described with reference to FIGS. 3, 4 and 9.

A body which includes the incident surface 211 and the emission surface 213 is formed (S10).

The first optical path converters 217 are continuously formed on the opposite surface 215 of the emission surface 213 to convert the optical path of the incident light introduced through the incident surface 211 and to allow the incident light to pass through the emission surface 213 (S20).

Then, the second optical path converters 216 are formed discontinuously in the particular direction on the opposite surface 215, with the first optical path converters 217 therebetween (S30). The order of the operations S20 and S30 may change with respect to each other.

Operation S20 may include an operation of forming a notch extending continuously in the particular direction on the opposite surface 215 by laser.

Operation S30 may include an operation of forming a notch arranged discontinuously on the opposite surface 215 by laser.

As described above, a light guide plate, a backlight unit and a display apparatus including the same and a manufacturing method thereof according to the present exemplary embodiment may realize a high brightness, and a clearer picture quality.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A light guide plate comprising:
a body which comprises an incident surface and an emission surface;
at least one first optical path converter which is formed in an opposite surface of the body which is opposite to the emission surface, and extends continuously in a first direction to convert an optical path of incident light introduced through the incident surface so that the incident light passes through the emission surface; and
at least one second optical path converter which is formed in the opposite surface, and is arranged discontinuously in at least one row extending in the first direction.

2. The light guide plate according to claim 1, wherein the first direction comprises one of a lengthwise direction of the body of the light guide plate, a widthwise direction of the body and an inclined direction which is inclined at an angle with the lengthwise direction.

3. The light guide plate according to claim 1, wherein the at least one first optical path converter comprises a plurality of first optical path converters extending continuously in the first direction and arranged in parallel a second direction which is perpendicular to the first direction, and the at least one second optical path converter is interposed between the plurality of first optical path converters.

4. The light guide plate according to claim 3, wherein the at least one second optical path converter comprises a plurality of second optical path converters interposed between the plurality of first optical path converters, a first one of the plurality of second optical path converters is arranged discontinuously in a first row which extends in the first direction, and a second one of the plurality of second optical path converters is arranged discontinuously in a second row which extends in the first direction and is spaced from the first row in a second direction perpendicular to the first direction.

5. The light guide plate according to claim 3, wherein the second optical path converters arranged in the first and second rows are arranged in zigzag pattern in the first direction.

6. The light guide plate according to claim 1, wherein the first and second optical path converters comprise at least one of a notch and an ink dot.

7. The light guide plate according to claim 1, further comprising a plurality of projections which protrude from the emission surface.

8. A backlight unit comprising:
the light guide plate according to claim 1; and
a light source which outputs light to the incident surface of the light guide plate.

9. A display apparatus comprising:
a liquid crystal display (LCD) panel;
an image processor which processes an image to be displayed on the LCD panel; and
a backlight unit which supplies light to the LCD panel, the backlight unit comprising:
a light guide plate comprising a body which comprises an incident surface and an emission surface, at least one first optical path converter which is formed in an opposite surface of the body which is opposite to the emission surface, and extends continuously in a first direction to convert an optical path of incident light introduced through the incident surface so that the incident light passes through the emission surface, and at least one second optical path converter which is formed in the opposite surface, and is arranged discontinuously in at least one row extending in the first direction; and
a light source which outputs light to the incident surface of the light guide plate.

10. The display apparatus according to claim 9, wherein the first direction comprises one of a lengthwise direction of the body of the light guide plate, a widthwise direction of the body and an inclined direction which is inclined at an angle with the lengthwise direction.

11. The display apparatus according to claim 9, wherein the at least one first optical path converter comprises a plurality of first optical path converters extending continuously in the first direction and arranged in parallel a second direction which is perpendicular to the first direction, and the at least one second optical path converter is interposed between the plurality of first optical path converters.

12. The display apparatus according to claim 11, wherein the at least one second optical path converter comprises a plurality of second optical path converters interposed between the plurality of first optical path converters, a first one of the plurality of second optical path converters is arranged discontinuously in a first row which extends in the first direction, and a second one of the plurality of second optical path converters is arranged discontinuously in a second row which extends in the first direction and is spaced from the first row in a second direction perpendicular to the first direction.

13. The display apparatus according to claim 11, wherein the second optical path converters arranged in the first and second rows are arranged in zigzag pattern in the first direction.

14. The display apparatus according to claim 9, wherein the first and second optical path converters comprise at least one of a notch and an ink dot.

15. The display apparatus according to claim 9, further comprising a plurality of projections which protrude from the emission surface.

16. A method of manufacturing a light guide plate, the method comprising:
forming a body which comprises an incident surface and an emission surface;
forming at least one first optical path converter in an opposite surface of the body which is opposite to the emission surface, the at least one first optical path converter extending continuously in a first direction to convert an optical path of an incident light introduced through the incident surface so that the incident light passes through the emission surface; and
forming at least one second optical path converter in the opposite surface, the at least one second optical path converter arranged discontinuously in at least one row extending in the first direction.

17. The method according to claim 16, wherein the forming the at least one first optical path converter comprises forming a notch extending continuously in the first direction on the opposite surface by laser.

18. The method according to claim 16, wherein the forming the at least one second optical path converter comprises forming by a laser a plurality of notches arranged discontinuously in the at least one row on the opposite surface.

19. The method according to claim 16, wherein the first direction is a lengthwise direction of the body of the light guide plate, a widthwise direction of the body and an inclined direction which is inclined at an angle with the lengthwise direction.

\* \* \* \* \*